May 13, 1924.
V. BENDIX
1,493,726
ENGINE STARTER
Original Filed Dec. 16, 1918
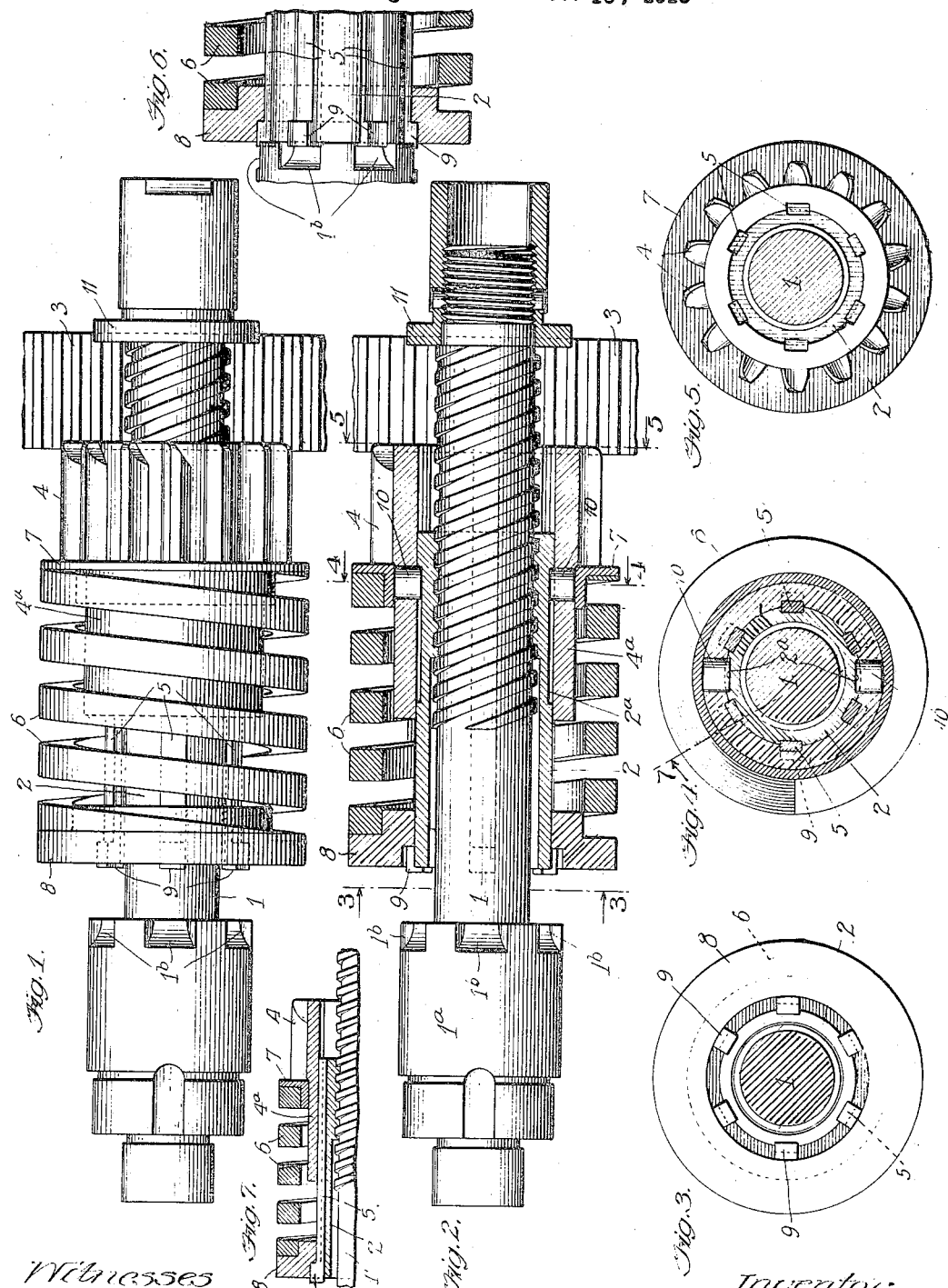
Witnesses
Martin H. Olsen
Inventor
Vincent Bendix
By Rector, Hibben, Davis & Macauley
His Attys.

Patented May 13, 1924.

1,493,726

UNITED STATES PATENT OFFICE.

VINCENT BENDIX, OF CHICAGO, ILLINOIS.

ENGINE STARTER.

Application filed December 16, 1918, Serial No. 267,069. Renewed February 27, 1924.

*To all whom it may concern:*

Be it known that I, VINCENT BENDIX, a citizen of the United States, residing at Chicago, Cook County, Illinois, have invented certain new and useful Improvements in Engine Starters, of which the following is a specification.

My invention relates to engine starters and pertains more particularly to the production of a novel and efficient construction of drive or transmission therefor. My drive is of that type characterized by the employment of a screw shaft and a driving member thereon adapted to be automatically advanced into mesh with an engine member, and to be automatically demeshed therefrom after the engine has started on its own power. The various features of advantage and utility in construction and mode of operation will be apparent from the description hereinafter given.

In the drawing, Fig. 1 is an elevation of a drive embodying my invention; Fig. 2 a longitudinal section thereof, Figs. 3, 4, and 5 cross sections on the correspondingly indicated lines on Fig. 2;

Fig. 6 a detailed view showing the normal or home position of the sleeve and the driving head; and Fig. 7 a detailed section on the line 7 of Fig. 4 looking in the direction of the arrow.

Referring to the particular embodiment of my invention as herein shown, the screw shaft 1 is provided with a driving head 1ª which, when power operated, is connected, either directly or indirectly, with a starting motor such as an electric motor, not necessary to be shown, but exemplified in my prior patents, for instance, No. 1,125,935, dated January 26, 1915. Upon the screw threads of this shaft there is screw threaded a control member or nut 2 which is in the form of a sleeve having its forward or right-hand end portion of its bore screw threaded and the remainder counterbored plain. By reason of the rotation of this shaft this nut is automatically moved longitudinally towards the fly wheel 3 and is automatically returned to normal position in the manner hereinafter explained.

Upon the control member or nut 2 a driving member or pinion 4 is mounted for longitudinal movement on the nut and for rotary movement therewith, in the present instance such pinion being splined thereon by means of the series of splines 5. As shown, this pinion has a body portion provided with teeth and a cylindrical extension 4ª, such pinion proper normally projecting beyond one end of the nut and such extension being always within the length of the nut. The pinion is thus kept in its normally extended position by means of a coiled spring 6, one end bearing against the right angled flanged ring 7 which bears against the inner end of the pinion teeth, and at the other end against a flanged ring or collar 8 which is held in proper position by means of the lugs 9. The purpose of this spring will be explained during the description of operation. In order to limit the outward movement of the pinion with respect to the nut but to permit inward movement thereof I provide the two pins 10 which extend through the extension 4ª of the pinion and within the longitudinal grooves 2ª of the nut. The outward movement of the pinion is limited by the contact of these pins against the right-hand end of these grooves.

According to Figs. 1 and 2, the nut and its pinion have already left their normal positions on the screw shaft and the meshing of the pinion with the fly wheel has already begun. This longitudinal movement of the nut and pinion is the result of the rotation of the screw shaft which has advanced the nut longitudinally and thereby has advanced the pinion. Continued longitudinal movement of these parts will cause the pinion to mesh with the fly wheel and when full mesh has obtained, and the pinion has been stopped by contact with the stop nut 11 which is secured to the outer end of the screw shaft, such pinion will partake of the rotary movement of the shaft and will rotate the fly wheel. When the engine has started on its own power, the pinion will be automatically demeshed, and together with the nut will be returned to normal position.

By preference, I provide positive stops for the pinion on its return movement on the shaft, the same comprising a series of radial projections or lugs 9 on the nut and corresponding notches 1ᵇ in the shouldered portion of the shaft. These projections contact the notches rather squarely and binding of the nut on the shaft is therefore avoided.

Because of the fact that the longitudinal movement of the pinion is stopped by the stop nut on the shaft, the drive or torque is through the splines between the pinion and nut or sleeve, and also through the coiled spring, such spring yielding until the fly wheel is broken loose, and also yielding as the resistance of the fly wheel varies, especially when going over compression points.

In the event that the pinion teeth when so advanced should not register properly with the fly wheel but should abut the same end to end, the pinion would be momentarily stopped in its longitudinal movement, but as the nut would continue to advance the relative movement between said pinion and nut is taken up by the spring 6 which tends to resist such movement, with the result that the shock of this impingement is cushioned and jamming is prevented. The pinion will thereupon move slightly angularly until proper register is obtained, whereupon full mesh with the fly wheel will result.

I claim:

1. A drive for engine starters comprising a rotatable shaft, a control member mounted thereon for longitudinal movement thereof and rotary movement therewith, and a driving member adapted to engage an engine member and mounted on the control member for rotary movement therewith and longitudinal movement thereof.

2. A drive for engine starters comprising a rotatable screw shaft, a control member in the form of a sleeve screw-threaded thereon for longitudinal movement thereof and rotary movement therewith, and a driving member adapted to engage an engine member and mounted on the sleeve for rotary movement therewith and longitudinal movement thereof.

3. A drive for engine starters comprising a rotatable screw shaft, a control member in the form of a sleeve screw-threaded thereon for longitudinal movement thereof and rotary movement therewith, and a pinion splined on the sleeve for rotary movement therewith and longitudinal movement thereof.

4. A drive for engine starters comprising a rotatable shaft, a control member mounted thereon for longitudinal movement thereof and rotary movement therewith, a driving member adapted to engage an engine member and mounted on the control member, and a spring interposed between the control member and driving member.

5. A drive for engine starters comprising a rotatable screw shaft, a control member in the form of a sleeve screw-threaded thereon for longitudinal movement thereof and rotary movement therewith, a pinion splined on the sleeve for rotary movement therewith and longitudinal movement thereof, and a spring interposed between the sleeve and pinion.

6. A drive for engine starters comprising a rotatable screw shaft, a control member in the form of a sleeve screw-threaded thereon for longitudinal movement thereof and rotary movement therewith, a pinion splined on the sleeve for rotary movement therewith and longitudinal movement thereof, and a coiled spring encircling the sleeve and bearing at the opposite ends against the sleeve and the pinion respectively.

7. A drive for engine starters comprising a rotatable shaft, a control member mounted thereon for longitudinal movement thereof and rotary movement therewith, a driving member adapted to engage an engine member and mounted on the control member, and stop means on the shaft against which said driving member abuts upon full engagement with the engine member.

8. A drive for engine starters comprising a rotatable shaft, a control member mounted thereon for longitudinal movement thereof and rotary movement therewith, a driving member adapted to engage an engine member and mounted on the control member, a spring interposed between the control member and driving member tending to keep them extended, and stop means on the shaft against which said driving member abuts upon full engagement with the engine member.

9. A drive for engine starters comprising a rotatable screw shaft, a control member in the form of a sleeve screw-threaded thereon for longitudinal movement thereof and rotary movement therewith, a pinion splined on the sleeve for rotary movement therewith and longitudinal movement thereof, and a stop projection on the shaft against which the pinion abuts upon full engagement with the engine member.

10. A drive for engine starters comprising a rotatable shaft, a control member mounted thereon for longitudinal movement thereof and rotary movement therewith, a driving member adapted to engage an engine member and mounted on the control member and projecting from one end thereof, and stop means on the shaft against which the driving member abuts when in full engagement with the engine member.

11. A drive for engine starters comprising a rotatable shaft, a control member mounted thereon for longitudinal movement thereof and rotary movement therewith, a driving member adapted to engage an engine member and mounted on the control member and projecting from one end thereof, and a spring acting on the driving and control members tending to keep them extended.

12. A drive for engine starters comprising a rotatable shaft, a control member mounted thereon for longitudinal movement thereof and rotary movement therewith, a driving member adapted to engage an engine member and mounted on the control member and projecting from one end thereof, means for retaining the driving member on the control member, and a spring acting on the driving and control members tending to keep them extended.

13. A drive for engine starters comprising a rotatable screw shaft, a control member in the form of a sleeve screw-threaded thereon for longitudinal movement thereof and rotary movement therewith, a pinion splined on the sleeve for rotary movement therewith and longitudinal movement thereof and projecting from one end thereof, and a spring acting on the sleeve and pinion tending to keep them extended.

14. A drive for engine starters comprising a rotatable screw shaft, a control member in the form of a sleeve screw-threaded thereon for longitudinal movement thereof and rotary movement therewith, and a pinion splined on the sleeve for rotary movement therewith and longitudinal movement thereof and projecting from one end thereof, said pinion having a pin and slot connection with the sleeve to retain the pinion onto the sleeve but permit of limited longitudinal movement thereon.

15. A drive for engine starters comprising a rotatable screw shaft, a control member in the form of a sleeve screw-threaded thereon for longitudinal movement thereof and rotary movement therewith, a pinion splined on the sleeve for rotary movement therewith and longitudinal movement thereof and projecting from one end thereof, and means for retaining the pinion on the sleeve comprising a pin extending radially through the pinion and a groove in the sleeve into which the pin projects.

16. A drive for engine starters comprising a rotatable screw shaft, a control member in the form of a sleeve screw-threaded thereon for longitudinal movement thereof and rotary movement therewith, a pinion splined on the sleeve for rotary movement therewith and longitudinal movement thereof and projecting from one end thereof, said pinion having a pin and slot connection with the sleeve to retain the pinion on the sleeve but permit of limited longitudinal movement thereon, and a spring acting on the sleeve and pinion respectively tending to keep the pinion at its outward limit of movement with respect to the sleeve.

17. A drive for engine starters comprising a rotatable screw shaft, a control member in the form of a sleeve screw-threaded thereon for longitudinal movement thereof and rotary movement therewith, a pinion having a hub extension splined on the sleeve for rotary movement therewith and longitudinal movement thereof, and a coiled spring encircling the sleeve and extension and bearing against the sleeve at one end and against the pinion at the other end.

18. A drive for engine starters comprising a rotatable screw shaft, a control member in the form of a sleeve screw-threaded thereon for longitudinal movement thereof and rotary movement therewith, a pinion having a hub extension splined on the sleeve for rotary movement therewith and longitudinal movement thereof, said sleeve having a spring abutment at one end, a ring encircling the extension and bearing against a side of the pinion, and a coiled spring interposed between the abutment and the ring.

19. A drive for engine starters comprising a rotatable shaft, a control member mounted thereon for longitudinal movement thereof and rotary movement therewith, and a driving member mounted upon the control member and adapted to engage an engine member, and driving means connecting between the control and driving members including a spring and splines interposed between said members.

20. A drive for engine starters comprising a rotatable shaft, a nut mounted thereon for longitudinal movement thereof and rotary movement therewith, a pinion mounted on said nut and adapted to engage an engine member and controlled in its movements by the nut, and a spring arranged between the nut and pinion and adapted to be compressed by the continued longitudinal movement of the nut, whenever the pinion is stopped in its similar movement by abutting the engine member.

VINCENT BENDIX.